(12) United States Patent
Weber et al.

(10) Patent No.: US 8,516,668 B2
(45) Date of Patent: Aug. 27, 2013

(54) TORQUE ASSEMBLY AND METHOD OF MANUFACTURE

(75) Inventors: Joseph H. Weber, Holland, MI (US);
Philip A. Sotok, Holland, MI (US);
Tony Yung, Zeeland, MI (US)

(73) Assignee: VentureSource Solutions, Inc., Zeeland, MI (US)

( * ) Notice: Subject to any disclaimer, the term of this patent is extended or adjusted under 35 U.S.C. 154(b) by 32 days.

(21) Appl. No.: 13/279,363

(22) Filed: Oct. 24, 2011

(65) Prior Publication Data

US 2013/0097809 A1    Apr. 25, 2013

(51) Int. Cl.
  *B21K 13/02* (2006.01)
(52) U.S. Cl.
  USPC .................... 29/11; 29/897.2; 297/411.32
(58) Field of Classification Search
  USPC ............ 29/11, 897.2; 297/411.32; 16/337, 16/308
  See application file for complete search history.

(56) References Cited

U.S. PATENT DOCUMENTS

| | | | |
|---|---|---|---|
| 1,970,018 A * | 8/1934 | Poole | 408/43 |
| 2,390,168 A * | 12/1945 | Piot | 403/227 |
| 4,121,802 A | 10/1978 | Kluting et al. | |
| 5,165,145 A | 11/1992 | Sherman | |
| 5,231,734 A | 8/1993 | Rude | |
| 5,464,083 A | 11/1995 | Arnold et al. | |
| 5,509,176 A | 4/1996 | Karl | |
| 5,542,505 A | 8/1996 | Kempf | |
| 5,652,694 A | 7/1997 | Martin | |
| 5,697,125 A | 12/1997 | Gannon | |
| 5,749,124 A | 5/1998 | Lu | |
| 5,771,539 A | 6/1998 | Wahlstedt et al. | |
| 5,918,348 A | 7/1999 | Carpenter et al. | |
| 6,233,785 B1 | 5/2001 | Tanahashi | |
| 6,301,748 B1 | 10/2001 | Su-Man | |
| 6,393,662 B1 | 5/2002 | Huang et al. | |
| 6,530,123 B1 | 3/2003 | Wahlstedt | |
| 2002/0105217 A1 * | 8/2002 | Khedira et al. | 297/411.32 |
| 2006/0225248 A1 | 10/2006 | Ishiwata | |
| 2008/0040887 A1 | 2/2008 | Dickerson | |

* cited by examiner

*Primary Examiner* — David Bryant
*Assistant Examiner* — Ryan J Walters
(74) *Attorney, Agent, or Firm* — Warner Norcross & Judd LLP

(57) ABSTRACT

A torque assembly includes a spindle, a cap mounted on the spindle for rotation about the spindle, and a work-hardened, plastic sleeve inserted between the cap and the spindle for constant rotation of the sleeve and cap with respect to the spindle. The torque assembly may be installed onto a hinged object and fixed object with movement along a single axis. The torque assembly may be formed by: (a) providing a spindle having a base and a rod extending from the base; (b) providing a cap member with an annular section defining an inner diameter; (c) providing an annular plastic sleeve having an inner diameter and an outer diameter; (d) work-hardening the sleeve for a predetermined time period; (e) changing the inner diameter of the sleeve; and (f) inserting the spindle rod through the inner diameter of the sleeve.

9 Claims, 6 Drawing Sheets

TORQUE ASSEMBLY AND METHOD OF MANUFACTURE

BACKGROUND OF THE INVENTION

The present invention relates to torque devices, and more particularly to a torque assembly that enables constant, controlled torque for a hinged object.

Torque hinges are well known in a variety of applications. In general, a torque hinge provides a degree of resistance throughout the range of motion of a hinged object. In automobiles, torque hinges are commonly used to control the movement of objects such as storage compartment lids, sun visors, grab handles, and movable armrests. Other common applications include hinged portions of electronic devices, such as laptop computers.

One common style of torque hinge is a spring torque hinge, which typically includes a torsion spring wound around a shaft. The ends of the torsion spring are fixed in position to compress the coiled spring about the shaft, creating a friction fit between the spring and the shaft that creates resistance through the shaft's range of motion. Another torque hinge style eliminates the spring, and includes a shaft having a coating made from urethane, Teflon or another compressive material that is press fit into a housing to form an interference fit between the coated shaft and the housing.

Unfortunately, conventional torque hinges of all styles suffer from disadvantages in that they tend to wear out over time, decreasing the amount of friction on the shaft and thus reducing the amount of resistance on the shaft to an undesirable amount. In the case of spring torque hinges, the springs tend to come uncoiled over a period of time, reducing their compression about the shaft. Other materials suffer from wear or deformation, which tends to reduce the friction between those materials and the shaft over time. Many torque hinge designs are incapable of meeting current heightened safety and quality standards in various industries.

SUMMARY OF THE INVENTION

The present invention provides a torque assembly including a spindle, a cap mounted on the spindle for rotation about the spindle, and a work-hardened, plastic sleeve between the cap and the spindle for rotation about the spindle. The sleeve is work-hardened by a predetermined amount prior to a final insertion of the sleeve between the cap and the spindle.

In one embodiment, the spindle includes a rod and a base, and the cap includes a generally annular section having an inwardly extending flange at one end and an outwardly extending flange at the opposite end. The sleeve may be sized such that it fits flush with the outwardly extending flange. The spindle rod may be inserted through the sleeve and cap such that there is a gap between the spindle base and the cap. In one embodiment, the gap is approximately a 1" gap.

The spindle base may be attached to a fixed object, and the cap flange may attached to a hinged object such that the sleeve and cap rotate about the spindle as the hinged object moves with respect to the fixed object. In one embodiment, the torque assembly may be installed onto the hinged object and fixed object with movement along a single axis. For example, the torque assembly may be installed onto the hinged object by inserting a portion of the hinged object into the gap between the spindle base and the cap, with a portion of the fixed object positioned adjacent the spindle base opposite the hinged object.

In another embodiment, the assembly may include a torsion spring that acts as an assist mechanism when opening and closing the hinged object. The torsion spring may include a coil and a pair of ends, with one of the ends connected to the spindle base and the other end connected to the cap. In a more particular embodiment, a bracket extends from the spindle base in a direction generally parallel to the spindle rod. One of the spring ends connects to the bracket, and the other spring end connects to the outwardly extending flange on the cap.

The present invention further includes a method for forming a torque assembly. The method may include the steps of: (a) providing a spindle having a base and a rod extending from the base; (b) providing a cap member with an annular section defining an inner diameter; (c) providing an annular plastic sleeve having an inner diameter and an outer diameter; (d) work-hardening the sleeve for a predetermined time period; (e) changing the inner diameter of the sleeve; and (f) inserting the spindle rod through the inner diameter of the sleeve.

In one embodiment, the sleeve may be work-hardened by inserting the sleeve into the annular cap section and inserting the spindle rod through the inner diameter of the sleeve to compress the sleeve between the spindle rod and the annular cap section. The inner diameter of the sleeve may be changed by reaming the inner diameter to a size corresponding to a desired amount of torque.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENT

II. Overview

Figure 1:
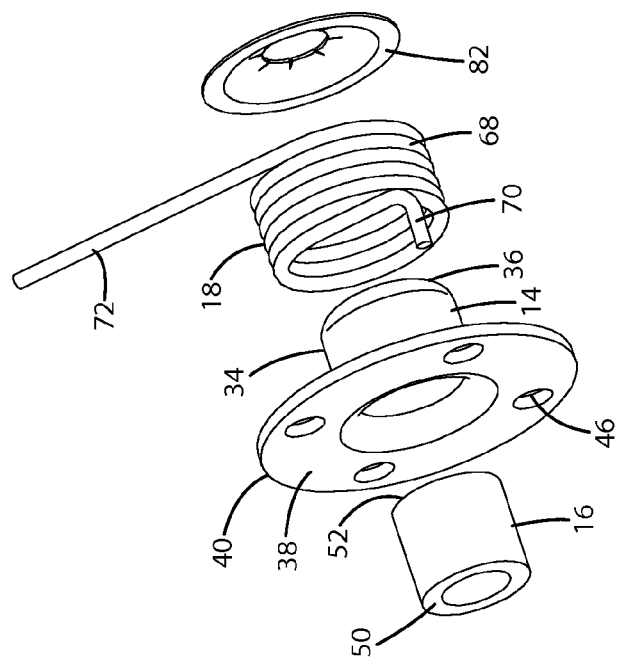
FIG. 1 shows an exploded view of a torque assembly according to one embodiment of the present invention.
Figure 1:
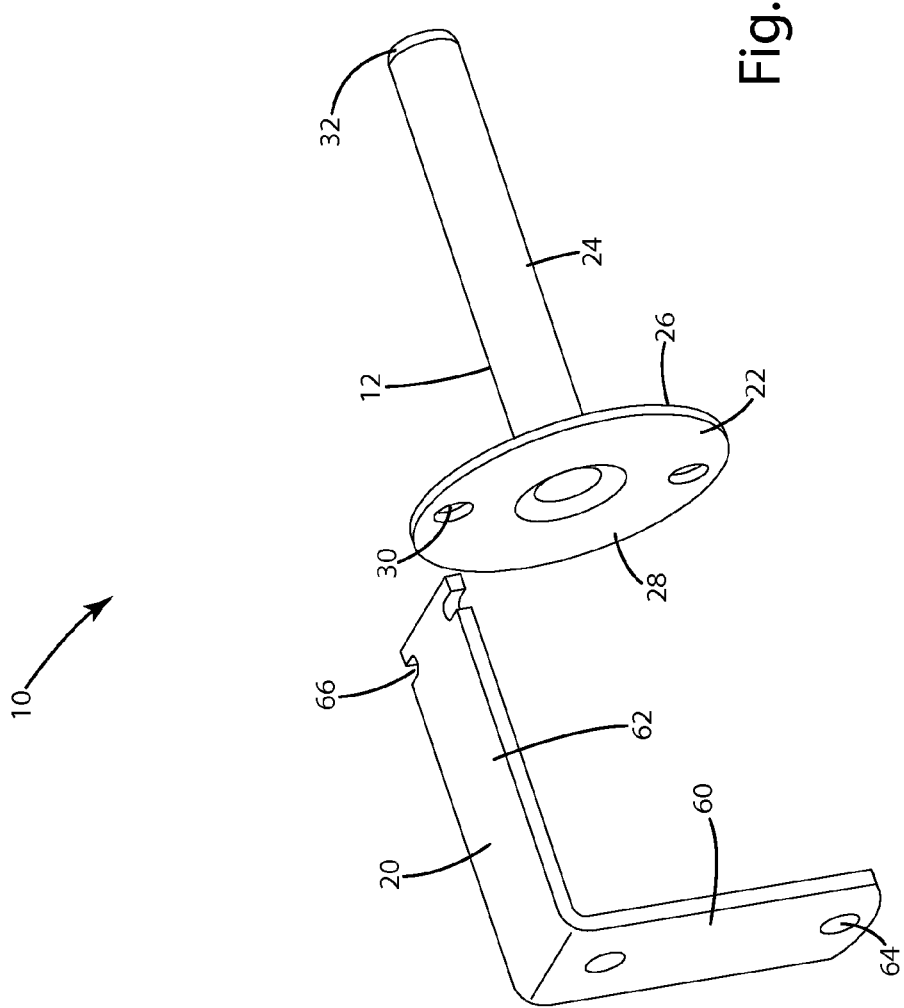

A torque assembly according to one embodiment of the present invention is shown in FIG. 1 and generally designated 10. The torque assembly forms a torque hinge that provides resistance throughout the range of motion for a hinged object. In the illustrated embodiment, the torque assembly includes a spindle 12, a cap 14 and a sleeve 16. The cap 14 is mounted on the spindle 12 for rotation about the spindle 12, and the sleeve 16 is positioned between the cap 14 and the spindle 12 to form a friction fit between the sleeve 16 and the spindle 12. In the embodiment shown in FIGS. 1-3 and 7-8, the torque assembly further includes a torsion spring 18 and a spring bracket 20. Throughout this description, directional terms, such as "vertical," "horizontal," "top," "bottom," "upper," "lower," "inner," "inwardly," "outer" and "outwardly," may be used to assist in describing the invention based on the orientation of the embodiments shown in the illustrations. The use of directional terms should not be interpreted to limit the invention to packages of any specific orientation(s).

II. Structure

The spindle 12 is typically formed from drawn steel, such as 1008 CRS (cold rolled steel) although other steel variations and other materials such as molded plastic may be used depending on the application. In one embodiment, the spindle 12 includes a generally circular base 22, and a generally cylindrical rod 24 extending from the base 22. The base 22 includes an upper surface 26 and a lower surface 28 opposite the upper surface 26. In one embodiment, the base 22 defines a pair of mounting holes 30 extending through the base 22 that are capable of receiving one or more fasteners for connecting the base 22 to a structure. The size and shape of the base 22, and the positioning of the mounting holes 30 on the base 22, may be varied in order to configure the spindle to mount to one or more of a variety of desired structures. The rod 24 may extend from the center of the upper surface 26 of the base 22 in a direction perpendicular to the base 22, to a distal free end 32. In one embodiment, the spindle base 22 has diameter of about 1.5" and a thickness between the upper 26 and lower 28 surfaces of about 0.048". The height of the spindle 12 is approximately 2.235" from the lower surface 28 to the distal end 32. The diameter of the rod 24 is approximately 0.330". In one embodiment, the diameter of the rod is tightly controlled at a particular section of the rod 24 intended to engage the sleeve 16. For instance, the tolerance of the rod diameter may be controlled to +/−0.0015" in a section of the rod from about 1.0" from the base 24 to about 1.75" from the base 24. In another embodiment, the dimensions of the rod and base may be varied in order to produce a desired torque for a particular application. Optionally, the rod may be a cylindrical tube capable of receiving a rod (not shown) extending through the center of the tube along the central axis of the torque assembly 10 to assist in the assembly of the device into a structure and serve as a mounting function for additional torque assemblies, or other devices, on the structure. In one embodiment, the rod may be a ¼" diameter rod, although various sizes of rod may be used, depending on the size of the spindle 12.

In one embodiment, the cap 14 is formed from drawn steel, such as 1008 CRS (cold rolled steel) although other steel variations and other materials such as molded plastic may be used depending on the application. The cap 14 generally includes an annular section 34 that is cylindrical in shape and extends between an upper end 36 and a lower end 38. In one embodiment (shown in FIG. 6), the annular section includes an inner diameter 42 and an outer diameter 44. The inner diameter 42 may be about 0.515". The cap 14 may include an outwardly extending flange 40 extending from the lower end 38 for attaching the cap 14 to a structure, such as a hinged object. The flange 40 may define one or more mounting holes 46 capable of receiving fasteners and/or other objects, such as a portion of a torsion spring. The outwardly extending flange 40 may be circular in shape, and may extend around the entire circumference of the annular section 34. The upper end 36 of the cap 14 may include an inwardly extending flange 48 forming a partially closed upper end 36. In one embodiment, the outwardly extending flange 40 has a diameter of about 1.5", the inwardly extending flange 48 extends inwardly about 0.1", and the cap 14 has an overall height of about 0.563".

The sleeve 16 is generally cylindrical, annular element formed from molded plastic. In one embodiment, the sleeve 16 is formed from a homopolymer acetal, such as Delrin®, manufactured by DuPont. Alternatively, the sleeve 16 could be formed from another material having desired strength and coefficient of friction characteristics. The sleeve 16 generally includes a first end 50, a second end 52, an inner diameter 54 and an outer diameter 56. In one embodiment, the outer diameter 56 of the molded sleeve 16 is at least as great as the inner diameter 42 of the cap 14. The height of the sleeve 16 between the first 50 and second 52 ends may be varied from application to application to affect the torque output of the assembly 10, as the torque output increases linearly with the length of the sleeve 16.

As discussed in more detail below, the molded sleeve 16 is reworked prior to its final insertion into the cap 14. In one embodiment, the sleeve 16 is work-hardened for a predetermined period of time prior to its final insertion into the cap 14. For instance, the sleeve 16 may be work-hardened by press fitting the sleeve 16 into the interior of the annular section 34 of the cap 14, and by inserting the spindle 12 through the inner diameter 54 of the sleeve 16 an initial time. The sleeve 16, spindle 12 and cap 14 assembly may be left in this state for a predetermined time, such as 24 hours, to compress the plastic sleeve 16 such that the crystalline structure of the plastic sleeve 16 is altered and the sleeve 16 is plastically deformed. The plastic deformation of the sleeve 16 results in the removal of creep deformation from the sleeve 16, thus work-hardening the sleeve 16. In another embodiment, the sleeve 16 may be work-hardened by a different method, such as an alternative method of compression.

In addition, the inner diameter 54 of the sleeve 16 may be altered after the sleeve 16 has been work hardened. For instance, the inner diameter 54 may be reamed out to a desired, predetermined size that is known to produce a desired torque output in the final assembly. In one embodiment, the inner diameter 54 of the sleeve 16 is reamed to 0.322" to achieve a desired high torque output, or the inner diameter 54 is reamed to 0.330" to achieve a desired low torque output.

Figure 2:
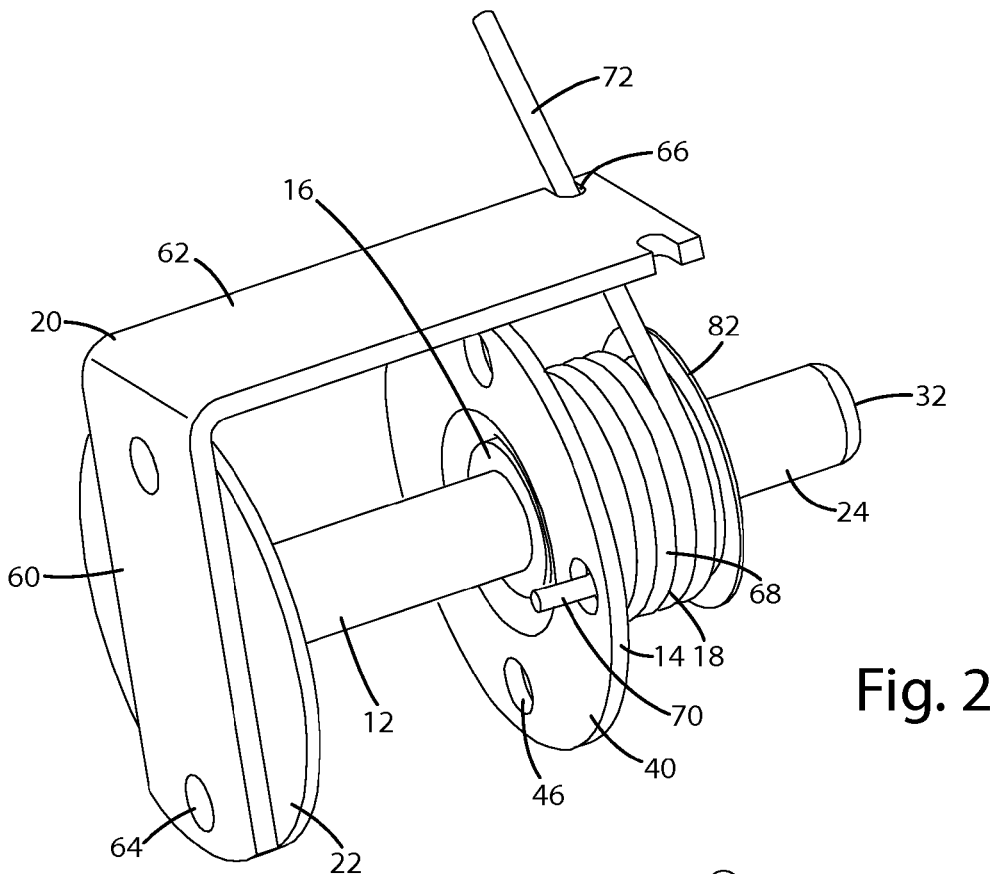
FIG. 2 shows an assembled view thereof.
Figure 3:
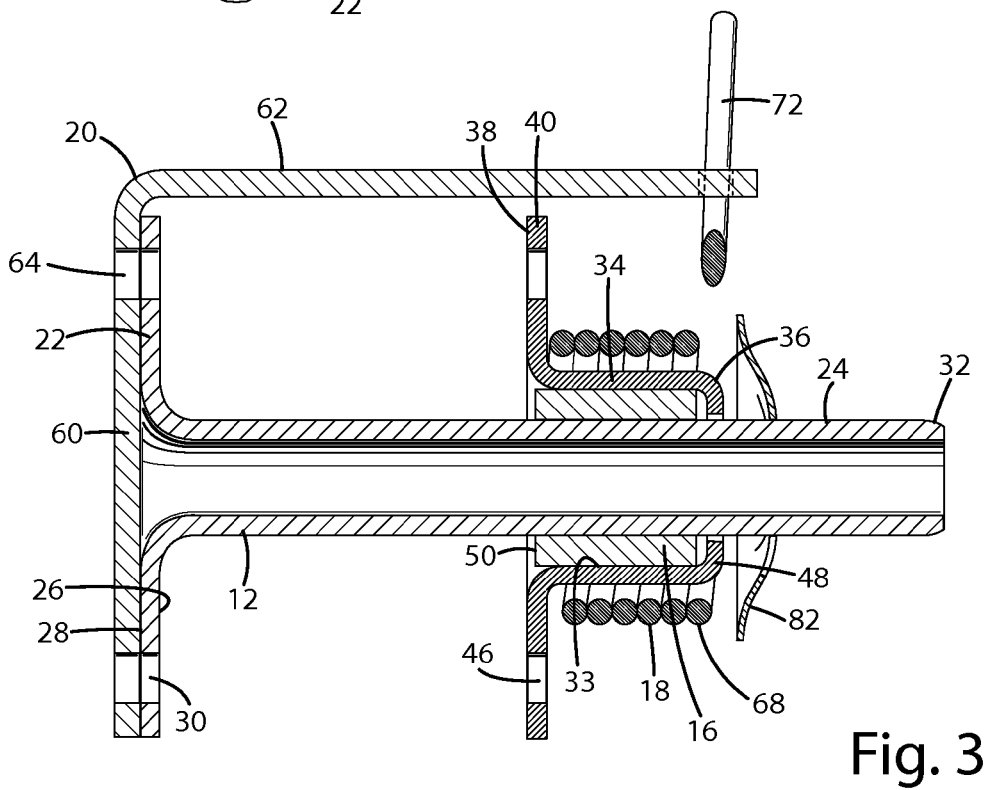
FIG. 3 shows a side cross-sectional view thereof.

As shown in FIGS. 1-3, the assembly may include additional elements, such as the torsion spring 18 and spring bracket 20. As shown, the bracket 20 is a rigid, angled bracket having a first leg 60 and a second leg 62 extending at about a ninety degree angle from the first leg 60. The first leg 60 may be secured to the spindle base 22, for instance, by welding the first leg 60 to the spindle base 22, or by extending fasteners (not shown) through mounting holes 64 in the first leg 60 and the mounting holes 30 in the spindle base 22. The second leg 62 may extend parallel to the spindle rod 24, and may include one or more notches 66 therein. In the illustrated embodiment, the torsion spring 18 includes a coil portion 68, a first end 70 extending from one side of the coil portion 68 and a second end 72 extending from the opposite end of the coil portion 68. The torsion spring 18 is attached between the spindle 12 and the cap 14 such that it can partially uncoil when the cap 14 is rotated in one direction to provide assistance to a user that is moving a hinged object attached to the cap 14 and/or spindle 12. As illustrated, the coil portion 68 is wound around the annular section 34 of the cap 14, the first end 70 extends into one of the mounting holes 46 on the outwardly extending flange 40 on the cap 14, and the second end 72 extends into one of the notches 66 in the bracket 20. In one embodiment, the assembly further includes a stop washer 82 positioned on the spindle rod 22.

As shown in FIGS. 2 and 3, in the final assembly, the cap 16 is inserted into the annular section 34 of the cap 14 with the first end 50 of the sleeve 16 being flush with the lower surface 28 of the spindle base 22. The spindle rod 24 is inserted through the inner diameter 54 of the sleeve 16, leaving a gap between the spindle base 22 and the cap 14. In one embodiment, the gap is about a 1.0" gap. The stop washer 82 is positioned on the spindle rod 24 over the upper end 36 of the cap 14. In the embodiment including a torsion spring 18 and bracket 20, the spring 18 is connected between the bracket 20 and the cap 14 as described above.

Figure 4:
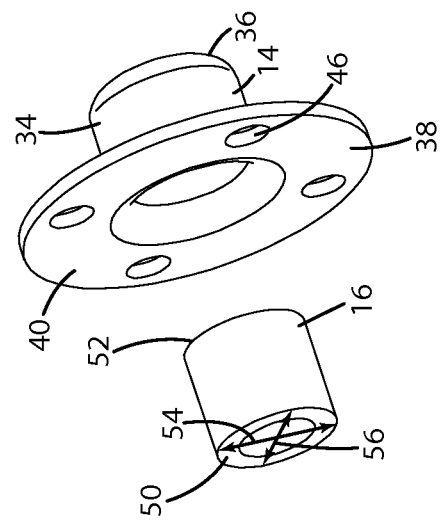
FIG. 4 shows an exploded view of a torque assembly according to another embodiment of the present invention.
Figure 4:
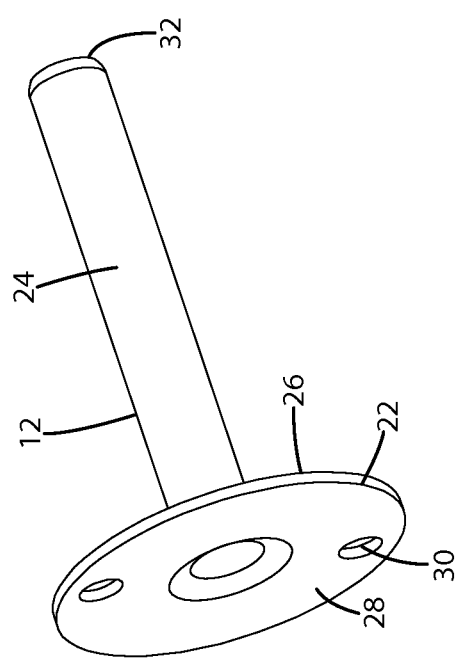
Figure 5:
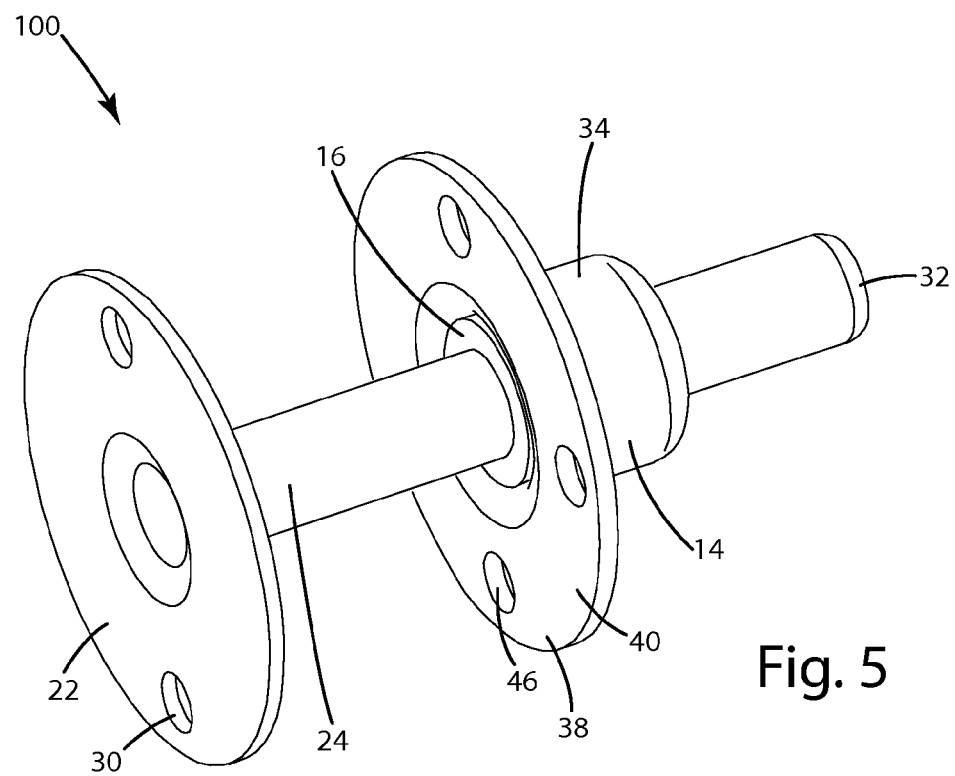
FIG. 5 shows an assembled view thereof.
Figure 6:
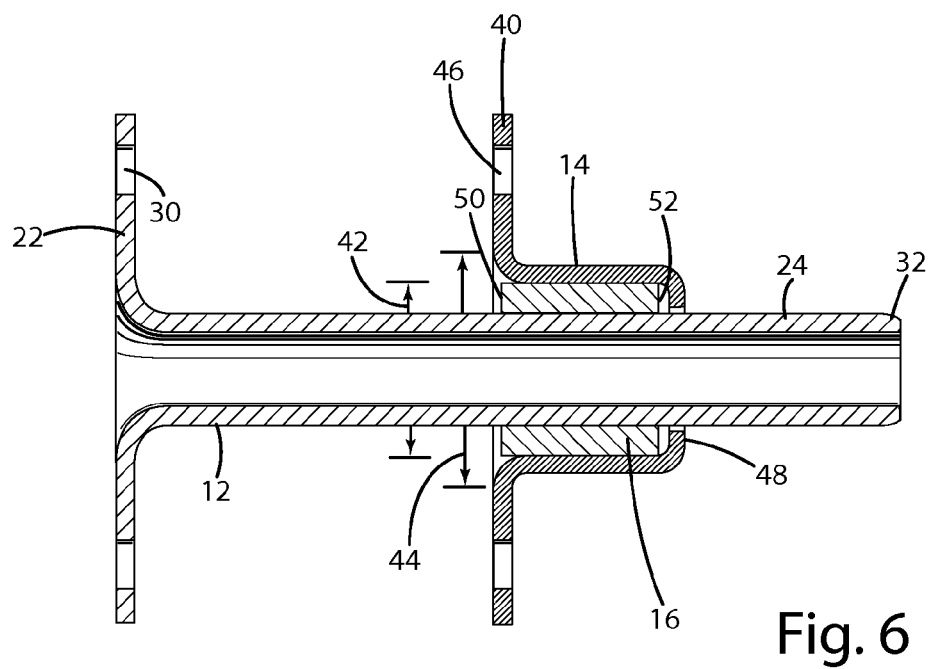
FIG. 6 shows a side cross-sectional view thereof.

FIGS. 4-6 show an optional alternative embodiment of the torque device 100, wherein the spring 18, bracket 20 and stop washer 82 are not included. As shown, the remaining components of the torque device 100, including the spindle 120, cap 140 and sleeve 160 are the same as those described above in connection with the torque device 10, and therefore will not be described again in great detail. Suffice it to say that the sleeve 160 is inserted into the cap 140, and the spindle 120 is inserted through the sleeve 160 such that the cap 140 and sleeve 160 rotate about the spindle 120 with a degree of resistance created by the interference fit between the sleeve 160 and the spindle 120.

Figure 7:
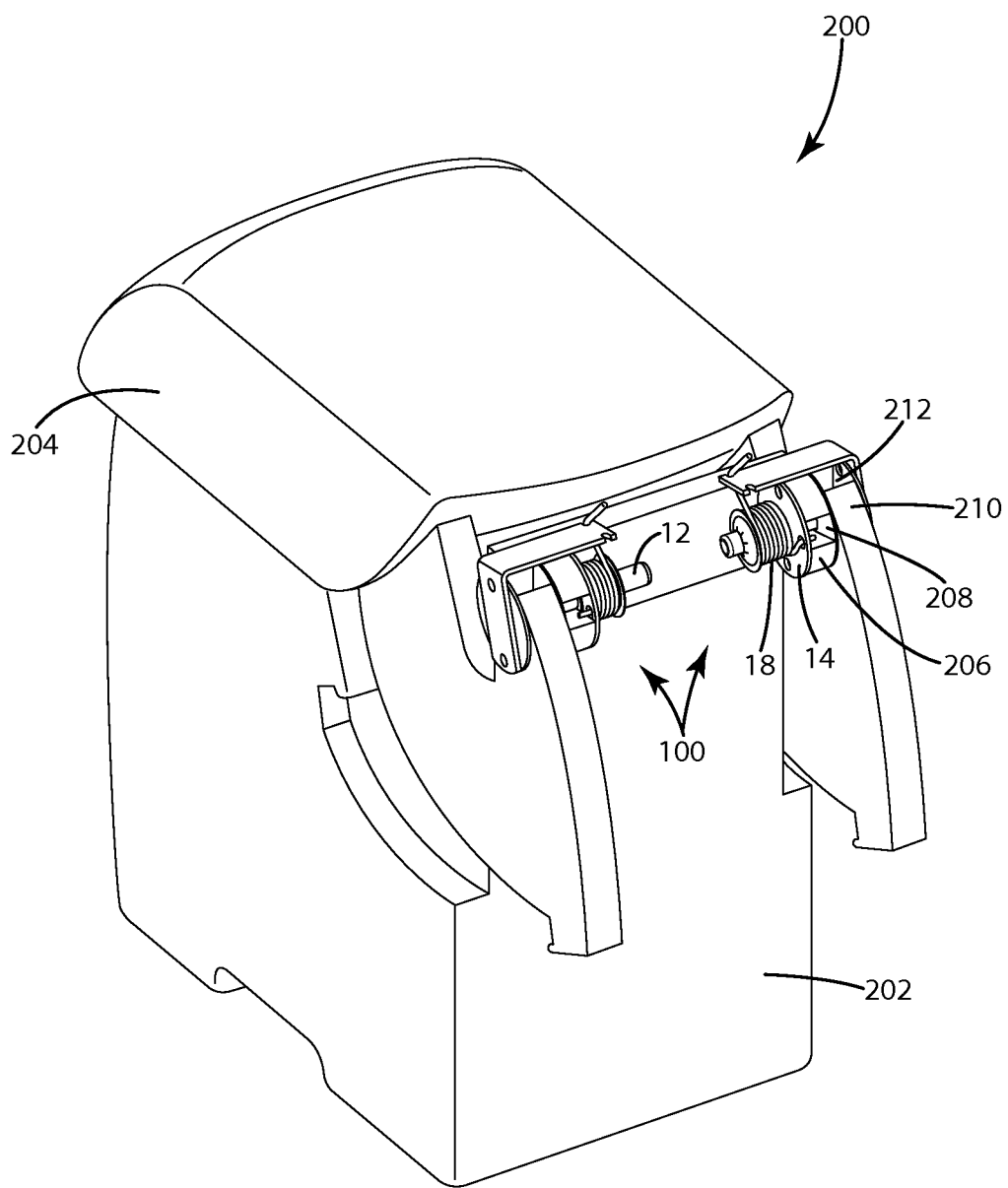
FIG. 7 shows a perspective view of a torque assembly according to the present invention installed into an armrest storage assembly.
Figure 8:
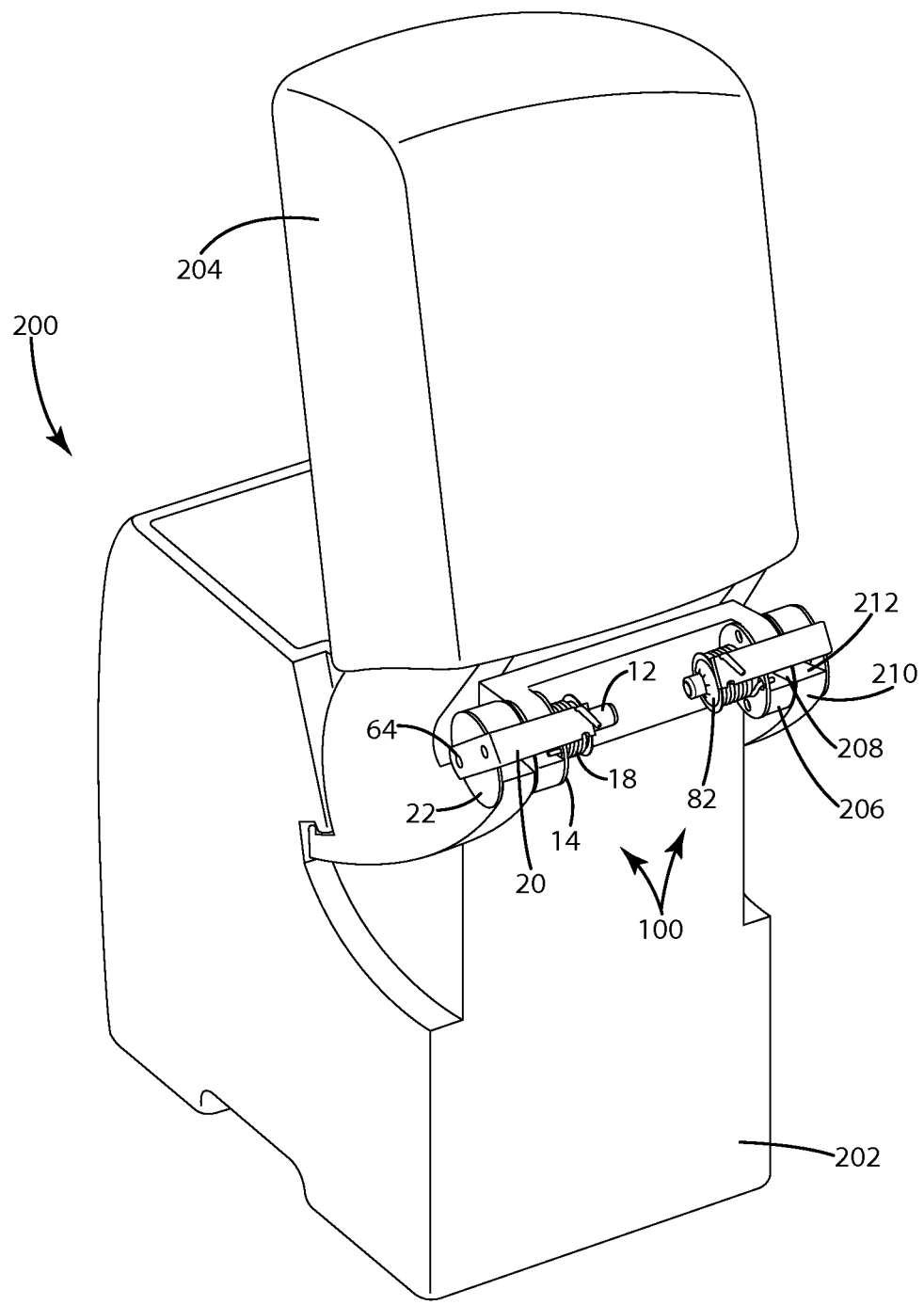
FIG. 8 shows a perspective view thereof with the armrest lid in an open position.

FIGS. 7-8 show one embodiment of the torque assembly 10 installed into an armrest storage assembly 200. As shown, the armrest assembly 200 includes a fixed object 202 forming the armrest base, and a hinged object 204 forming the armrest and storage lid. The armrest assembly—as well as other hinged applications used with the torque assembly 10—may be arranged such that the torque assembly 10 installation may be accomplished by inserting the torque assembly 10 along only a single axis. In one embodiment, the armrest base 202 includes a pair of protrusions 206 extending rearward from the base 202, with each protrusion 206 defining a slot 208. The lid 204 includes two protrusions 210 extending rearward from the lid 204, with each protrusion 210 defining a slot 212. As shown in FIG. 8, when the lid 204 is in an open position, the slots 208 and 212 are aligned with each other. A torque assembly 10 may be installed into each adjacent set of protrusions 206, 210 by moving the torque assembly in one direction such that the lid protrusion 210 and the base protrusion 206 are inserted between the spindle base 22 and the cap 14. The spindle base 22 is attached to the lid 204 by a conventional method, such as fasteners extending through the lid protrusion 210 and the mounting holes 30 on the spindle base 22. The cap 14 is attached to the armrest base 202 by a conventional method, such as fasteners extending through the base protrusion 206 and the mounting holes 46 on the cap 14. The lid 204 may be moved between the open position shown in FIG. 8 and the closed position shown in FIG. 7 by moving the lid 204 and thus rotating the cap 14 and sleeve 16 about the fixed spindle 12. In the embodiment including a torsion spring 18, the spring 18 may be arranged such that it is partially uncoiled as the armrest lid 204 is moved to the open position to assist a user in opening the armrest lid 204.

III. Method of Manufacture

In one embodiment, the manufacture of the torque device includes the steps of: (a) providing the spindle 12 having a base 22 and a rod 24 extending from the base; (b) providing the cap member 14 with an annular section 34 having an inner diameter 42; (c) providing the annular plastic sleeve 16 having an inner diameter 54 and an outer diameter 56, the outer diameter 56 of the sleeve 16 being at least the same as the inner diameter 42 of the annular cap section 34; (d) work-hardening the sleeve 16 for a predetermined time period; (e) changing the inner diameter 54 of the sleeve 16; and (f) inserting the spindle rod 24 through the inner diameter 54 of the sleeve 16.

The spindle 12 may be formed by drawing and/or stamping the base portion 22 and a rod portion 24 from steel, such as cold rolled steel. As noted above the tolerances for at least portions of the spindle may be tightly controlled. In one embodiment, the diameter of the rod 22 is particularly controlled within the section of the rod 24 intended to engage the sleeve 16. For instance, the tolerance of the rod diameter may be controlled to 0.330"+/−0.0015" in a section of the rod from about 1.25" from the base 24 to about 1.75" from the base 24.

The cap 14 may be formed by drawing and or stamping in a manner similar to the spindle 12. In the illustrated embodiment, the cap 14 is formed to include the annular section 34, the outwardly extending flange 40 extending from one end 36 of the annular section 34, and the inwardly extending flange 48 extending from the opposite end 38 of the annular section 34. Although the dimensions of the cap 14 may be varied from application to application, certain dimensions of the cap 14, particularly the inner diameter 42 of the annular section 34, may be controlled to a predetermined amount. In the illustrated embodiment, the inner diameter 42 of the annular section 34 is 0.51".

The sleeve 16 may be formed my injection molding, extrusion, or another conventional technique. In one embodiment, the sleeve 16 is formed from molded homopolymer acetal, Delrin®, manufactured by DuPont. Other acetals, and other plastics, may otherwise be used. In one embodiment, the sleeve 16 is molded to have a height between the first end 50 and the second end 52 of about 0.4375" an outer diameter 56 of about 0.520" and an inner diameter 54 of about 0.322".

The sleeve 16 is work-hardened, typically by compression, in order to plastically deform the sleeve 16 to reduce creep deformation prior to its final insertion into the cap 14. In one embodiment, the sleeve 16 is work-hardened by compressing the sleeve 16 in the cap 14. This may be done by press-fitting the sleeve 16 into the interior of the annular section 34 of the cap 14, which may require about 500 pounds of force. In one embodiment, the sleeve 16 is inserted into the cap 14 such that the end 50 of the sleeve 16 is flush with the lower surface 28 of the spindle base 24 such that the entire sleeve 16 is under a compressive force.

After the sleeve 16 has been inserted into the cap 14, the spindle 12, more particularly the spindle rod 24, may be inserted through the inner diameter 54 of the sleeve 16 to compress the sleeve 16 between the spindle rod 24 and the inner wall 33 of the annular section 34 of the cap 14. The cap 14 and sleeve 16 may be inserted onto the spindle 12 at a specific location along the spindle rod 24. For instance, the spindle 12 may be inserted through the sleeve 16 until the cap 14 and sleeve 16 are about 1.00"+/−0.25" from the base 22 of the spindle 12. The assembly of the spindle 12, cap 14 and sleeve 16 may be left intact for a predetermined period of time that is known to sufficiently alter the internal crystalline structure of the plastic sleeve 16 such that the sleeve 16 is plastically deformed and a degree of creep deformation has been removed from the sleeve 16. In one embodiment, the predetermined time period is at least 24 hours. In one example, the inner diameter 54 of the sleeve 16 may increase approximately 0.002" to 0.003" after a 24 hour period.

After the predetermined time period, the work-hardening of the sleeve 16 may be stopped and the sleeve 16 may be prepared for final insertion of the spindle 12. In the embodiment where the sleeve 16 is work-hardened by compression between the cap 14 and spindle 12, the work-hardening may be stopped by removing the sleeve 16 and cap from the spindle 12. In one embodiment, the sleeve 16 may remain inserted in the cap 14, and the sleeve 16 may be prepared while it remains in the cap 14. The sleeve 16 may be prepared for final insertion of the spindle 12 by altering the inner diameter 54 of the sleeve 16 to a desired amount. In one embodiment, the inner diameter 54 is altered by reaming the inner diameter 54 of the sleeve 16 with a reaming tool. The inner diameter 54 is reamed, or otherwise altered, to a size that has been determined to yield a particular torque output when the sleeve 16 is assembled with the spindle 12. In one embodiment, the inner diameter 54 of the sleeve 12 is reamed to about 0.322" to produce a relatively high torque output for the assembly 10, or to about 0.330" to produce a relatively low torque output for the assembly 10. Of course, other sizes may be used to provide different torque values, or to interact with differently sized spindle 12 and cap 14 components.

After the sleeve 16 has been prepared for final assembly, the spindle 12 is inserted through the inner diameter 54 of the sleeve 16. The cap 14 and sleeve 16 may again be positioned at a desired location along the sleeve 16. In one embodiment, the cap 14 and sleeve 16 are positioned such that they are spaced about 1" from the base 22 of the spindle 12. In an embodiment that includes the washer 80, the washer 80 may be inserted onto the spindle 12 prior to the insertion of the spindle 12 through the cap 14 and sleeve 16. A stop washer 82 may be inserted onto the spindle 12 after positioning of the cap 14 and sleeve 16. When the torque assembly 10 has been finally assembled. the cap 14 and sleeve 16 are capable of rotating together about the spindle rod 24, with the friction fit between the sleeve 16 and the spindle rid 24 providing a constant resistance throughout the range of motion of the cap 14.

In an embodiment including the torsion spring 18 and spring bracket 20, the bracket 20 may be attached to the spindle 12 at any time after the formation of the spindle 20. The bracket 20 may be attached by a conventional method, such as fasteners or welding, or it may alternatively be formed with the spindle as a single piece. The spring 18 may be added to the assembly after the cap 14 and sleeve 16 are positioned on the spindle 12. For instance, the coil portion 68 of the spring 18 is wound around the annular section 34 of the cap 14, and then the first end 70 is extended into one of the mounting holes 46 on the outwardly extending flange 40 on the cap 14, and the second end 72 is extended into one of the notches 66 in the bracket 20.

As noted above, the torque assembly 10 (or torque assembly 100 with torsion spring) may be installed into one of a variety of applications for use as a torque hinge. In the embodiment shown in FIGS. 7 and 8, the torque assembly 100 is installed into an armrest storage assembly 200. In one embodiment, this installation is initiated by aligning the slots 208 on the two protrusions 206 of the fixed armrest base 202 with the slots 212 on the two protrusions 210 of the hinged armrest lid 204 by placing the lid 204 in the open position shown in FIG. 8. A torque assembly 100 (or torque assembly 10) may then be installed into each adjacent set of protrusions 206, 210 by moving the torque assembly 100 in a single direction (i.e., along one axis) such that the lid protrusion 210 is inserted between the spindle base 22 and the washer 80 and the base protrusion 206 is inserted between the washer 80 and the cap 14. As noted above, the spindle base 22 is attached to the lid 204 by a conventional method, such as fasteners extending through the lid protrusion 210 and the mounting holes 30 on the spindle base 22. The cap 14 is attached to the armrest base 202 by a conventional method, such as fasteners extending through the base protrusion 206 and the mounting holes 46 on the cap 14. The lid 204 may be moved between the open position shown in FIG. 8 and the closed position shown in FIG. 7 by moving the lid 204 and thus rotating the cap 14 and sleeve 16 about the fixed spindle 12. As shown in FIGS. 7 and 8, the spring 18 is arranged such that it is partially uncoiled as the armrest lid 204 is moved to the open position to assist a user in opening the armrest lid 204. In another embodiment, the torque assembly 100 may be installed with the cap 14 attached to the hinged portion 204 and the spindle 12 attached to the base portion 202. The torque assembly 10 may be similarly installed into other hinged applications, with one of the spindle 12 and cap 14 attached to the hinged member and the other of the spindle 12 and cap 14 attached to a fixed member. The relative sizes of the spindle rod 24, cap 14 and sleeve 16 (particularly the inner diameter 54 of the sleeve 16) may be altered to provide a desired torque output for each application.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method for forming a torque assembly comprising the steps of:

providing a spindle having a base and a rod extending from the base;

providing a cap member with an annular section defining an inner diameter;

providing an annular plastic sleeve having an inner diameter and an outer diameter, the outer diameter of the sleeve being greater than the inner diameter of the annular cap section;

work-hardening the sleeve by inserting the sleeve into the annular cap section and inserting the spindle rod through the inner diameter of the sleeve to compress the sleeve between the spindle rod and the annular cap section for a predetermined time period;

removing the spindle rod from the sleeve after the predetermined time period;

changing the inner diameter of the sleeve; and reinserting the spindle rod through the inner diameter of the sleeve.

2. The method of claim 1 wherein the reinsertion of the spindle rod includes maintaining a gap between the spindle base and the cap.

3. The method of claim 2 wherein the gap is about 1.00".

4. The method of claim 1 wherein the predetermined time period is at least 24 hours.

5. The method of claim 1 wherein the sleeve is formed to include a first end and a second end and the annular section of the cap is formed to include an open end and a partially closed end, wherein the sleeve is reinserted such that the first end of the sleeve is flush with the open end of the annular section of the cap.

6. The method of claim 1 including connecting the cap to a fixed object and connecting the spindle base to a hinged object such that the hinged object can move relative to the fixed object by rotating the spindle rod within the fixed cap and sleeve.

7. The method of claim 1 including attaching a torsion spring between the spindle base and the cap, wherein rotation of the spindle with respect to the cap uncoils the torsion spring.

8. A method for forming a torque assembly comprising:

providing a spindle having a base and a generally cylindrical rod extending from the base;

providing a cap having an annular section with an first end and a second end, the second end including an inwardly extending flange partially closing the second end;

forming an annular plastic sleeve having an inner diameter and an outer diameter;

work-hardening the sleeve for a predetermined time period to remove creep from the plastic sleeve;

inserting the sleeve into the annular section of the cap; and inserting the spindle rod through the inner diameter of the sleeve;

inserting the spindle rod through the sleeve to leave a gap between the cap and the spindle base;

inserting a portion of a fixed object into the gap between the cap and the spindle base;

attaching the fixed object to the cap;

inserting a portion of a hinged object into the gap between the cap and the spindle base; and attaching the hinged object to the spindle base.

9. The method of claim 8 including the step of reaming the inner diameter of the sleeve after the sleeve has been work-hardened.

* * * * *